Patented Nov. 17, 1942

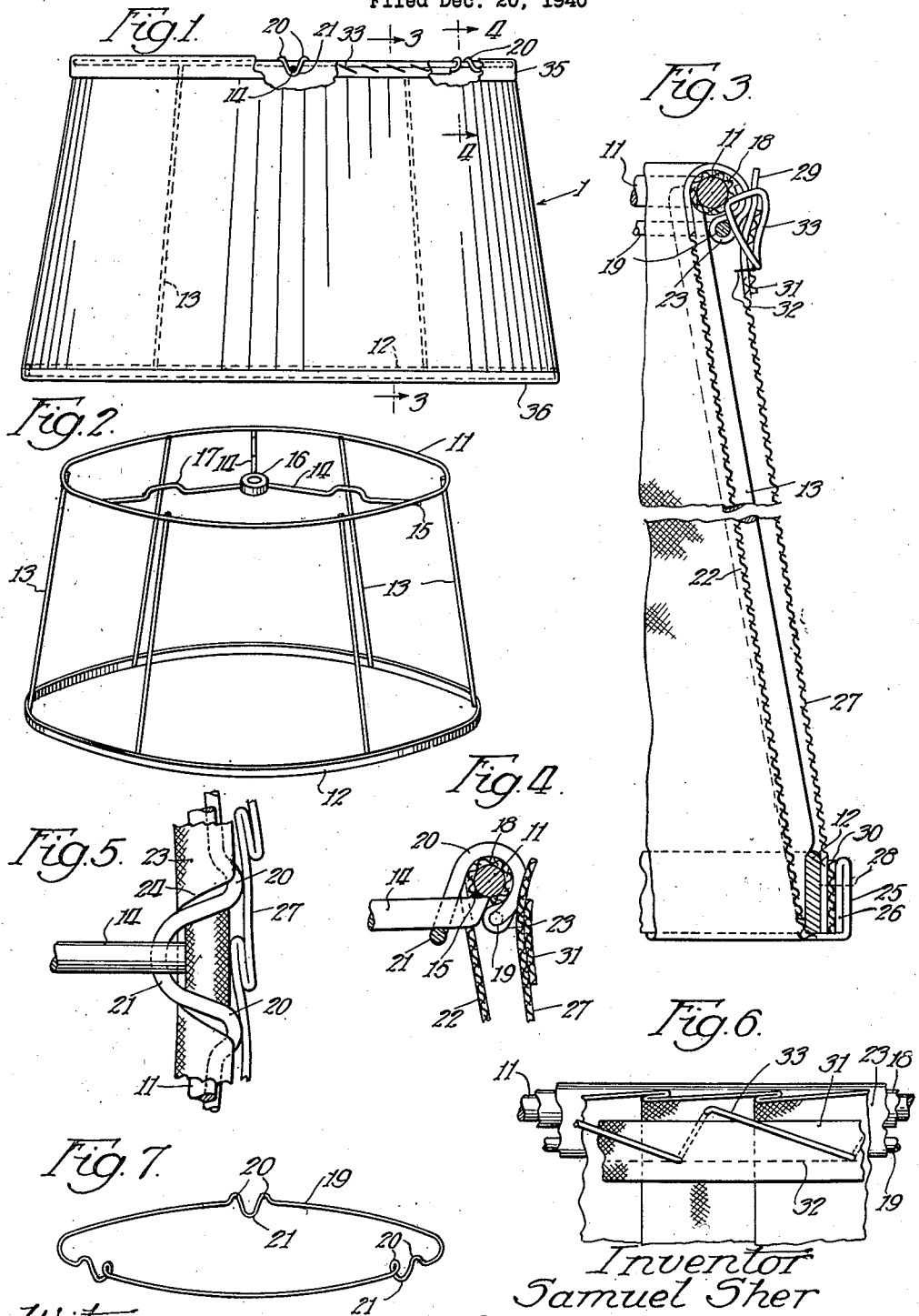

2,302,267

UNITED STATES PATENT OFFICE 2,302,267

LAMP SHADE

Samuel Sher, Chicago, Ill.

Application December 20, 1940, Serial No. 370,998

6 Claims. (Cl. 240—108)

My invention relates to an improved shade construction, particularly a novel construction and arrangement of the frame covering material and to improved means for securing the covering material of the shade to the frame.

An object of the invention is to provide a construction wherein the covering material may be secured to a pre-built frame and frame support which are rigidly secured together prior to the application of the covering material to the same.

Another object of the invention is to provide a novel construction and arrangement to facilitate the fitting and securing of the covering material of the shade structure to the frame and support.

Many other objects and advantages of the construction herein shown and described will be obvious to those skilled in the art from the disclosure herein given.

To this end, my invention consists in the novel construction, arrangement and combination of parts herein shown and described, and more particularly pointed out in the claims.

One embodiment of the present invention is shown for illustrative purposes in the drawing, in which:

Fig. 1 is an elevational view of a lamp shade structure embodying features of the invention, a portion of the shade structure being broken away to better illustrate the construction thereof;

Fig. 2 is a perspective view of the frame of the shade with the covering removed;

Fig. 3 is an enlarged fragmentary side elevation of a portion of the structure illustrated in Fig. 1, taken substantially on line 3—3 of Fig. 1;

Fig. 4 is a detail sectional view taken substantially on line 4—4 of Fig. 1;

Fig. 5 is an enlarged top elevation of a portion of the shade shown in Fig. 1 and Fig. 4;

Fig. 6 is an enlarged side elevation of a portion of Fig. 1 at the top of the shade; and Fig. 7 is a perspective view of a hoop-like ring shown in Figs. 1, 3, 4 and 5.

The invention is illustrated as applied to a lamp shade construction consisting of a unitary frame and a support therefor and a substantially pre-built covering adapted to be applied to the frame and securely fastened thereto.

Referring particularly to Fig. 2, the construction consists of top and bottom annular bands or frame members 11 and 12 rigidly connected by a plurality of rods 13, it being understood that the frame members may be other than annular in configuration if desired. The shade is adapted to be supported by a plurality of inwardly extending bars 14 having their outer ends rigidly fastened by welding or the like as indicated at 15, to the frame member 11, and having their inner ends connected by a ring 16 or the equivalent to which said bars are fastened to form a spider construction. Preferably the bars 14 are each provided with a hump 17 equally spaced from the ring 16 to add ornateness to the structure and to hold the shade in position when seated on the peripheral edge of a lamp globe or the like.

The described construction, consisting of the frame members 11 and 12, rods 13, bars 14 and ring 16, provides a unitary structure which is substantially rigid. Other types or styles of finished shades may be provided by changing the configuration of the frame members 11 and 12.

Facility and rapidity of assembling and fitting of the covering material on the unitary frame structure is accomplished by substantially pre-building the covering preliminary to mounting it on the frame. Obviously, it is desirable for the sake of appearance that the covering material arranged around the frame be substantially taut. For this purpose one edge of the covering material is connected with the ring 19 before it is mounted on the frame. The ring 19 is preferably constructed of wire or similarly resilient material having a cross-sectional diameter such that it may be distorted and has sufficient rigidity to cause it to return to its original shape upon release of the distorting force. As shown in the drawing, the diameter of the ring 19 is very slightly larger than the diameter of the frame member 11 around and underneath which the ring extends. The ring 19 provides a plurality of concentric segments connected by a corresponding number of bends 20, each of the bends forming a loop 21 adapted to extend over the top of the member 11 and underneath and in engagement with one of the bars 14. The bends 20 and loops 21 permit the circumferential segments of the ring 19 to be moved either inwardly or outwardly to temporarily distort the ring for mounting it on the member 11 as hereinafter described.

The shade proper consists of an inner covering 22 and an outer covering 27 of suitable material. One edge of the material, in the present instance the upper edge, is secured on the ring or member 19 by suitable sewing or stitching before it is mounted on the member 11 as above described, the extreme edge being looped back as most clearly shown in Fig. 3. The adjacent frame member 11 is provided with a tape covering the same, as indicated at 18, so that the frame member will not tend to cut the material. The opposite edge of the material 22 is extended, as shown at 25—26, and secured to a tape 30 and the edge of the outer covering 27. The upper end 29 of the cover 27 is extended up, as shown in Fig. 3, to adjacent the edge of the inner cover, the same being reinforced by a tape 31 secured thereto by stitching 32 or the equivalent. The upper end is secured to the top frame tape 18 by means of lacing 33 or its equivalent. It may be mentioned that the outer cover may, if desired, be provided with pleats to add to the attractiveness of the cover.

In assembling the shade the ring 19 is secured to the edge of the inner cover as described. The inner diameter of the ring 19 is slightly smaller than the outer diameter of the frame member 11. The ring is pushed through the frame member 11 with the loops 21 registering with the bars 14. The ring 19 is of a size that when pushed through and sprung over the frame member 11 it may be seated as shown in Figs. 4 and 5. It underlies the frame member 11, but owing to the bent portions 20, extends over the frame member with the loops 21 engaging under the bars 14, these supports 14 preventing the ring and edge of the inner cover from moving upwardly or becoming displaced after it has been sprung into the position shown in Fig. 4. The next step is to bring the edge of the outer cover 27 up to the top frame as indicated at 29 and lace the same in position as described. After the shade has been so assembled, an ornamental tape 35—36 may be applied at the exterior about the frame to cover the stitches and make the shade more attractive.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a lamp shade and in combination, a top frame member, a bottom frame member, connecting means between top and bottom frame members, supporting members rigidly secured to one frame member and extending inwardly the shade and connected together at their intersection, a hoop-like member extending about one of the frame members and having spaced means for engaging the under, or inner, edges of said support members, said hoop-like member having portions intermediate said means positioned adjacent the outer edge of the adjoining frame member, a covering material having one of its edges secured to said hoop-like member and extending around the frame members, and means for securing the other edge portion of said covering material to the frame member adjacent said hoop-like member.

2. In a lamp shade construction, a top frame member, a bottom frame member, and means for rigidly connecting the two together, supporting members permanently secured to one frame member and extending inwardly the shade, a covering material, a resilient ring secured to an edge of said covering material, said ring normally of slightly less internal diameter than the external diameter of one of the frame members and sprung into place at the outside of said frame member, said ring having a loop for each support member, engaging the same and preventing displacement of the seated ring, the other edge of said covering material extending around the frame members, and means for securing said last mentioned edge of the covering material to the frame member adjacent said ring.

3. In a lamp shade construction of the kind described, top and bottom frame members permanently rigidly connected together, one of said frame members provided with inwardly extending rods providing shade supporting means, a covering material having one of its edges provided with an annular resilient securing member of a size adapting it to be sprung through and to engage the adjacent frame member, said resilient member having inwardly projecting loops extending over said adjacent frame member and engaging the lower edges of said supporting rods, the other edge portion of said covering material extending over the opposite frame member and thence to adjacent said resilient member and secured to the frame member adjacent said resilient member.

4. In a shade of the kind described and in combination, a frame consisting of top and bottom band members and means interconnecting said members to form a unitary structure, a plurality of inwardly extending supporting bars each having one end rigidly secured to one of said band members, means rigidly connecting the other ends of said supporting bars, a hoop-like member extending around the outside of one of said band members and having a plurality of loops each extending over said member and underneath one of said supporting bars, and a sheet of material extending around and through said frame to provide an outer and an inner cover, one edge of said sheet being secured to said hoop member and the opposite edge being secured to the frame adjacent said hoop member.

5. In a shade of the kind described and in combination, a frame consisting of top and bottom annular members and means interconnecting said members to form a unitary structure, a plurality of inwardly extending supporting bars each having one end rigidly secured to one of said annular members, means rigidly connecting the converging ends of said supporting bars, a hoop-like ring extending around the outside of and underneath one of said annular members and having a plurality of loops each extending over said member and underneath one of said supporting bars, the axial diameter of said ring being slightly greater than the axial diameter of the annular member around which it extends, and a sheet of material extending around and through said frame to provide an outer and an inner cover, one edge of said sheet being secured to said ring and the opposite edge being secured to the frame adjacent said ring.

6. In a lamp shade construction of the kind described, the combination of a shade frame comprising top and bottom frame members rigidly connected together, one of said frame members being provided with inwardly extending shade supporting means, a covering material having one of its edges secured to an annular resilient member of a size adapting it to be sprung through and to engage the adjacent frame member, said resilient member having inwardly projecting loops extending over said adjacent frame member and engaging the lower edges of said supporting means, and means for securing the opposite edge of said covering to said frame.

SAMUEL SHER.